(12) United States Patent
Yogo et al.

(10) Patent No.: US 12,203,793 B2
(45) Date of Patent: Jan. 21, 2025

(54) FLOW RATE MEASUREMENT DEVICE

(71) Applicant: Hitachi Astemo, Ltd., Hitachinaka (JP)

(72) Inventors: Takayuki Yogo, Hitachinaka (JP); Binti Haridan Fatin Farhanah, Hitachinaka (JP); Akira Uenodan, Hitachinaka (JP); Hiroyuki Abe, Hitachinaka (JP); Mizuki Ijuin, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 278 days.

(21) Appl. No.: 17/776,859

(22) PCT Filed: Oct. 20, 2020

(86) PCT No.: PCT/JP2020/039326
§ 371 (c)(1),
(2) Date: May 13, 2022

(87) PCT Pub. No.: WO2021/095454
PCT Pub. Date: May 20, 2021

(65) Prior Publication Data
US 2022/0390264 A1 Dec. 8, 2022

(30) Foreign Application Priority Data
Nov. 14, 2019 (JP) .................................. 2019-206013

(51) Int. Cl.
*G01F 15/16* (2006.01)
(52) U.S. Cl.
CPC .................... *G01F 15/16* (2013.01)
(58) Field of Classification Search
CPC ...... G01F 15/16; G01F 1/6842; G01F 1/6845; G01F 1/692; G01F 5/00; F02M 35/10386
See application file for complete search history.

(56) References Cited

U.S. PATENT DOCUMENTS

2012/0324990 A1 12/2012 Briese
2018/0372521 A1 12/2018 Millies et al.
(Continued)

FOREIGN PATENT DOCUMENTS

JP 2018-538537 A 12/2018
JP 2019-66329 A 4/2019
(Continued)

OTHER PUBLICATIONS

International Search Report (PCT/ISA/210) issued in PCT Application No. PCT/JP2020/039326 dated Dec. 8, 2020 with English translation (five (5) pages).
(Continued)

*Primary Examiner* — Tarun Sinha
(74) *Attorney, Agent, or Firm* — Crowell & Moring LLP

(57) ABSTRACT

The objective of the present invention is to obtain a flow rate measurement device capable of reducing variations in the flow rate detection accuracy by suppressing the inclination of a chip package relative to a circuit board. A flow rate measurement device 20 of the present invention includes a chip package 310 having a flow rate sensor 311 and a passage wall 314 formed therein, and a circuit board 300 on which the chip package 310 is mounted, in which the chip package 310 is mounted such that the flow rate sensor 311 faces a portion of the circuit board 300 and a portion of the passage wall 314 as a resin portion of the chip package 310 contacts the circuit board 300.

9 Claims, 13 Drawing Sheets

(56) References Cited

U.S. PATENT DOCUMENTS

2020/0200613 A1    6/2020  Yogo et al.
2021/0148743 A1*   5/2021  Uenodan ................ G01F 1/684

FOREIGN PATENT DOCUMENTS

WO    WO 2019/049513 A1    3/2019
WO    WO 2019/064887 A1    4/2019

OTHER PUBLICATIONS

Japanese-language Written Opinion (PCT/ISA/237) issued in PCT Application No. PCT/JP2020/039326 dated Dec. 8, 2020 (four (4MHJ) pages).

* cited by examiner

FLOW RATE MEASUREMENT DEVICE

TECHNICAL FIELD

The present invention relates to a flow rate measurement device that measures the flow rate of a measured gas.

BACKGROUND ART

Patent Literature 1 describes "a physical quantity detection device that detects a physical quantity of a measured gas flowing in a main passage, the physical quantity detection device includes: a chip package formed by sealing, using resin, a flow rate sensor that detects a flow rate of the measured gas, a LSI that drives the flow rate sensor, and a lead frame supporting the flow rate sensor and the LSI; and a circuit board on which the chip package is mounted, wherein the chip package is fixed to the circuit board with a part of the chip package including the flow rate sensor projecting laterally from an end of the circuit board."

CITATION LIST

Patent Literature

Patent Literature 1: WO2019/064887A

SUMMARY OF INVENTION

Technical Problem

The flow rate measurement device of Patent Literature 1 has a structure in which a connection terminal provided in a base end portion of a chip package is fixed to a board by soldering, a recessed groove formed in a leading end portion of the chip package is disposed facing the board, and a flow rate sensor provided inside the recessed groove detects the flow rate of a measured gas flowing through a passage formed by the board and the recessed groove. Since the chip package is structured to be supported on the board through fixation by soldering in a cantilever state, the posture of the chip package is likely to be unstable in the fixation by soldering. Therefore, when the chip package is fixed by soldering with a posture further inclined relative to the board as compared to a reference, the size of the passage could change, and thus, there is a concern that variations in the flow rate detection accuracy of each object may occur.

The present invention has been made in view of the foregoing, and the objective is to obtain a flow rate measurement device capable of reducing variations in the flow rate detection accuracy by suppressing the inclination of a chip package relative to a board.

Solution to Problem

The flow rate measurement device of the present invention to solve the aforementioned problem includes: a resin package having a flow rate detection element and a passage wall formed therein; and a board on which the resin package is mounted, in which the resin package is mounted such that the flow rate detection element is disposed facing a portion of the board and a portion of a resin portion of the resin package contacts the board.

Advantageous Effects of Invention

According to the present invention, variations in the flow rate detection accuracy can be reduced by suppressing the inclination of the chip package relative to the board. Further features associated with the present invention will become apparent from the description of the present specification and the accompanying drawings. Problems, configurations, and effects other than those described above will be clarified by the following description of embodiments.

DESCRIPTION OF EMBODIMENTS

Figure 1:
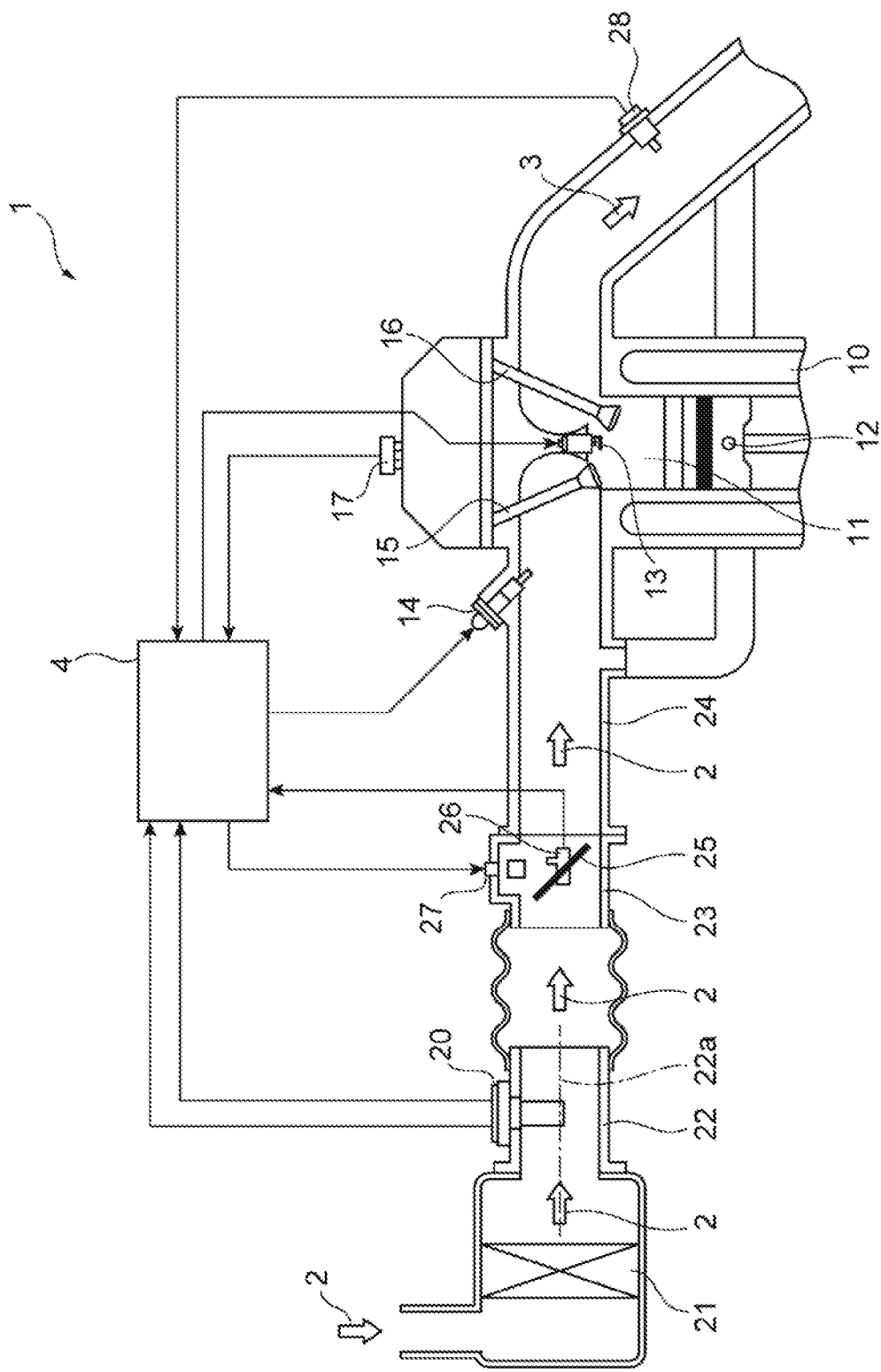
FIG. 1 is a system diagram illustrating an embodiment in which a flow rate measurement device according to the present invention is used in an internal combustion engine control system.

A mode for carrying out the present invention described below solves various problems required as an actual product, solves various problems desirable for use particularly as a detection device that detects a physical quantity of intake air of a vehicle, and produces various effects. One of the various problems solved by the following embodiments is the above-described contents in the column of Technical Problem, and one of the various effects produced by the following embodiments is the effect described in the column of Advantageous Effects of Invention. The various problems solved by the following embodiments and additionally, the various effects produced by the following embodiments will be described in the description of the following embodiments. Thus, the problems solved by the embodiments and the effects described in the following embodiments are also described in contents other than those in the column of Technical Problem and in the column of Advantageous Effects of Invention.

In the following embodiments, the same reference numerals indicate the same configurations even if the drawing numbers are different, and the same effects are obtained. For the configuration that is already described, only the reference numeral is attached to the drawing, and the description is omitted in some cases.

FIG. 1 is a system diagram illustrating an embodiment in which a flow rate measurement device according to the present invention is used in an electronic fuel injection-type internal combustion engine control system 1. Based on the operation of an internal combustion engine 10 including an engine cylinder 11 and an engine piston 12, intake air as a measured gas 2 is sucked from an air cleaner 21 and led to a combustion chamber of the engine cylinder 11 via an intake body that is, for example, a main passage 22, a throttle body 23, and an intake manifold 24. A physical quantity of the measured gas 2 that is the intake air led to the combustion chamber is detected by a flow rate measurement device 20 according to the present invention, and fuel is supplied from a fuel injection valve 14 based on the detected physical quantity and led to the combustion chamber in a state of an air-fuel mixture together with the measured gas 2. It should be noted that in the present embodiment, the fuel injection valve 14 is provided in an air intake port of the internal combustion engine, and the fuel injected into the air intake port forms an air-fuel mixture together with the measured gas 2, is led to the combustion chamber via an intake valve 15, and burns to generate mechanical energy.

The fuel and air lead to the combustion chamber are in a mixed state of fuel and air, and are explosively burned by spark ignition of a spark plug 13 to generate the mechanical energy. The combusted gas is led from an exhaust valve 16 to an exhaust pipe, and exhausted as an exhaust gas 3 from the exhaust pipe to the outside of a vehicle. A flow rate of the measured gas 2 that is the intake air led to the combustion chamber is controlled by a throttle valve 25 in which an opening degree changes based on the operation of an accelerator pedal. The fuel supply amount is controlled based on the flow rate of the intake air led to the combustion chamber, and a driver controls the flow rate of the intake air led to the combustion chamber by controlling the opening degree of the throttle valve 25, so that the mechanical energy generated by the internal combustion engine can be controlled.

The physical quantity such as the flow rate, temperature, humidity, and pressure of the measured gas 2 that is the intake air taken in from the air cleaner 21 and flowing through the main passage 22 is detected by the flow rate measurement device 20, and the flow rate measurement device 20 inputs an electric signal representing the physical quantity of the intake air to a control device 4. Further, the output of a throttle angle sensor 26 that measures the opening degree of the throttle valve 25 is input to the control device 4, and furthermore, a position and a state of the engine piston 12, the intake valve 15, or the exhaust valve 16 of the internal combustion engine and additionally, the output of a rotation angle sensor 17 for measuring the rotating speed of the internal combustion engine are input to the control device 4. The output of an oxygen sensor 28 is input to the control device 4 in order to measure the state of the mixture ratio of a fuel amount and an air amount from the state of the exhaust gas 3.

The control device 4 calculates a fuel injection amount and ignition timing based on the physical quantity of the intake air that is the output of the flow rate measurement device 20 and the rotating speed of the internal combustion engine that is measured based on the output of the rotation angle sensor 17. The amount of fuel supplied from the fuel injection valve 14 and the ignition timing ignited by the spark plug 13 are controlled based on the calculation results. The fuel supply amount and the ignition timing are delicately controlled actually further based on the temperature detected by the flow rate measurement device 20, the change state of a throttle angle, the change state of the engine rotating speed, and the state of the air-fuel ratio measured by the oxygen sensor 28. The control device 4 further controls the amount of air that bypasses the throttle valve 25 using an idle air control valve 27 in an idle operation state of the internal combustion engine, thereby controlling the rotating speed of the internal combustion engine in the idle operation state.

The fuel supply amount and the ignition timing, which are major variables in the internal combustion engine, are both calculated using the output of the flow rate measurement device 20 as a main parameter. Thus, improvement in the detection accuracy of the flow rate measurement device 20, control of a change with time, and improvement of reliability are important in terms of improvement of the control accuracy and guarantee of the reliability of a vehicle.

In particular, in recent years, there is an extremely high demand for fuel efficiency of a vehicle and an extremely high demand for purification of an exhaust gas. To meet these demands, it is extremely important to improve the detection accuracy of the physical quantity of the intake air detected by the flow rate measurement device 20. It is also important that the flow rate measurement device 20 maintains high reliability.

A vehicle on which the flow rate measurement device 20 is mounted is used in an environment with significantly variable temperature and humidity. The flow rate measurement device 20 preferably addresses changes in the temperature and humidity in the use environment and also dust and pollutants.

Further, the flow rate measurement device 20 is attached to an intake pipe that is affected by the heat generated by the internal combustion engine. Thus, the heat generated by the internal combustion engine is transmitted to the flow rate measurement device 20 via the intake pipe. Since the flow rate measurement device 20 detects the flow rate of the measured gas 2 by performing heat transfer with the measured gas 2, it is important to suppress the effect of the heat from the outside as much as possible.

As described below, the flow rate measurement device 20 mounted on a vehicle not only simply solves the problems described in the column of Technical Problem or not only produces the effects described in the column of Advantageous Effects of Invention, but also solves various problems required as a product and produces various effects by fully considering the aforementioned various problems, as described below. The specific problems solved and the specific effects produced by the flow rate measurement device 20 will be described in the description of the following embodiments.

First Embodiment

Figure 2:
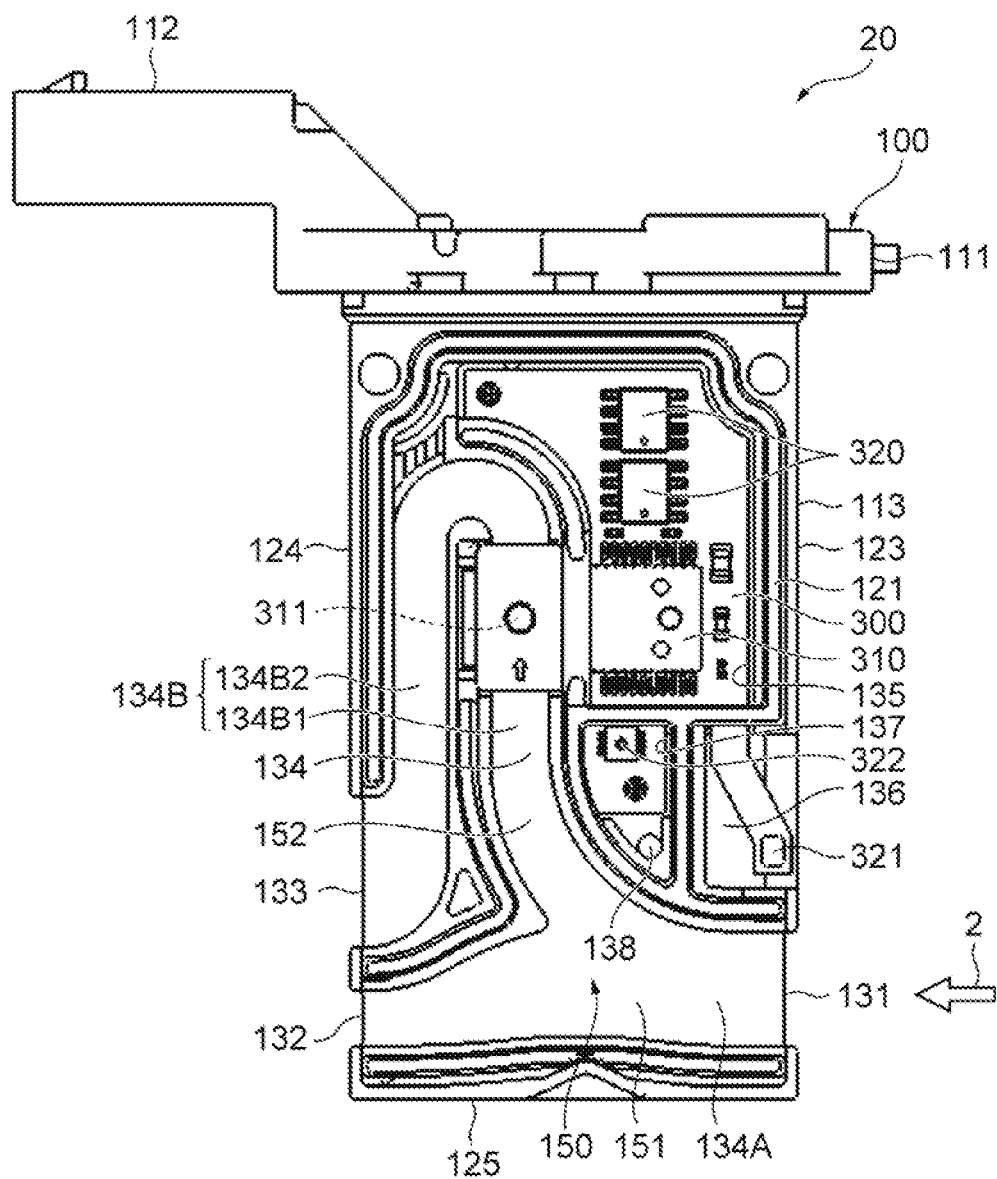
FIG. 2 is a front view of the flow rate measurement device in a first embodiment.

FIG. 2 is a front view of the flow rate measurement device in a first embodiment, with a cover removed from a housing. It should be noted that the following description is made assuming that a measured gas flows along a center axis 22a of the main passage 22.

The flow rate measurement device 20 is inserted to the inside of the main passage 22 through an attachment hole provided on a passage wall of the main passage 22 to be used in a state of being fixed to the main passage 22. The flow rate measurement device 20 includes a casing disposed in the main passage 22 through which the measured gas 2 flows. The casing of the flow rate measurement device 20 includes a housing 100 and a cover (not shown) to be attached to the front face of the housing 100. The housing 100 is formed by, for example, injection molding of a synthetic resin material. The cover is formed of a plate-shaped member made of, for example, a metal material or a synthetic resin material, and is formed of an injection-molded article of an aluminum alloy or a synthetic resin material in the present embodiment. The cover has a size that entirely covers the front face of the housing 100.

The housing 100 includes a flange 111 for fixing the flow rate measurement device 20 to the intake body that is the main passage 22, a connector 112 that projects from the flange 111 to be exposed to the outside from the intake body for electrical connection with an external device, and a measuring unit 113 extending so as to project from the flange 111 toward the center of the main passage 22.

The measuring unit 113 of the flow rate measurement device 20 is inserted to the inside through the attachment hole provided in the main passage 22, and the flange 111 of the flow rate measurement device 20 abuts on the main passage 22 to be fixed to the main passage 22 using a screw.

The measuring unit 113 is in a thin and long shape extending straight from the flange 111 and includes a front face 121 and a back face, which are wide, and a pair of narrow side faces 123, 124. The measuring unit 113 projects from an inner wall of the main passage 22 toward the passage center of the main passage 22, with the flow rate measurement device 20 attached to the main passage 22. The front face 121 and back face are disposed in parallel along the center axis of the main passage 22, the side face 123 on one side in a short-side direction of the measuring unit 113 of the narrow side faces 123, 124 of the measuring unit 113 is disposed facing the upstream side of the main passage 22, and the side face 124 on the other side in the short-side direction of the measuring unit 113 is disposed facing the downstream side of the main passage 22.

In the present embodiment, with the flow rate measurement device 20 attached to the main passage 22, a base end portion of the measuring unit 113 is disposed on the upper side and a leading end portion of the measuring unit 113 is disposed on the lower side. However, the posture state of the flow rate measurement device 20 in use is not limited to those in the present embodiment, but may be various posture states, for example, a posture state in which the base end portion and the leading end portion of the measuring unit 113 are horizontally attached at the same height.

In the following description, in some cases, the long-side direction of the measuring unit 113 that is a direction in which the measuring unit 113 extends from the flange 111 is referred to as a Z-axis, the short-side direction of the measuring unit 113 that is a direction extending from a sub-passage inlet 131 toward a first outlet 132 of the measuring unit 113 is referred to as an X-axis, and the thickness direction of the measuring unit 113 that is a direction from the front face 121 toward a back face 122 of the measuring unit 113 is referred to as a Y-axis.

The measuring unit 113 is provided with the sub-passage inlet 131 on the side face 123, and the first outlet 132 and a second outlet 133 on the side face 124. The sub-passage inlet 131, the first outlet 132, and the second outlet 133 are provided in the leading end portion of the measuring unit 113 that extends from the flange 111 toward the center direction of the main passage 22. Therefore, the gas near the center portion distanced from the inner wall surface of the main passage 22 can be taken into a sub-passage 134. Thus, the flow rate measurement device 20 can measure the flow rate of the gas in a portion distanced from the inner wall surface of the main passage 22, so that degradation in the measurement accuracy due to the effect of the heat or the like can be suppressed.

In the flow rate measurement device 20, the measuring unit 113 has a shape elongated along the axis from the outer wall toward the center of the main passage 22, while the widths of the side faces 123, 124 are formed narrow. This allows the flow rate measurement device 20 to reduce the fluid resistance to the measured gas 2 to a small value.

The measuring unit 113 of the flow rate measurement device 20 is provided with a flow rate sensor 311 that is a flow rate detection element, an intake air temperature sensor 321, and a humidity sensor 322. The flow rate sensor 311 has a diaphragm structure and is disposed in a middle of the passage of the sub-passage 134. The flow rate sensor 311 detects the flow rate of the measured gas 2 flowing through the main passage. The intake air temperature sensor 321 is disposed in a middle of the passage of a temperature detection passage 136 with one end opened near the sub-passage inlet 131 on the side face 123 and the other end opened on both the front face 121 and back face of the measuring unit 113. The intake air temperature sensor 321 detects the temperature of the measured gas 2 flowing through the main passage. The humidity sensor 322 is disposed in a humidity measuring chamber 137 of the measuring unit 113. The humidity sensor 322 measures the humidity of the measured gas 2 taken into the humidity measuring chamber 137 through a window 138 that opens on the back face of the measuring unit 113.

The housing 100 is provided with a sub-passage groove 150 for forming the sub-passage 134 and a circuit chamber 135 for housing a circuit board 300. The circuit chamber 135 and the sub-passage groove 150 are provided in a recessed manner on the front face of the measuring unit 113 and are structured to be covered with a cover (not shown) attached to the front face of the measuring unit 113. The circuit chamber 135 is provided in a region on one side (side face 123 side) in the X-axis direction that is a position on the upstream side in the flow direction of the measured gas 2 in the main passage 22. Further, the sub-passage groove 150 is provided across a region on the leading end side (lower face 125 side) relative to the circuit chamber 135 in the Z-axis direction of the measuring unit 113 and a region on the other side (side face 124 side) relative to the circuit chamber 135 in the X-axis direction that is a position on the downstream side in the flow direction of the measured gas 2 in the main passage 22.

The sub-passage groove 150 forms the sub-passage 134 in conjunction with the cover (not shown) that covers the front face of the measuring unit 113. The sub-passage groove 150 includes a first sub-passage groove 151 and a second sub-passage groove 152 that branches in a middle of the first sub-passage groove 151. The first sub-passage groove 151 is formed so as to extend between the sub-passage inlet 131 that opens on the side face 123 on one side of the measuring unit 113 and the first outlet 132 that opens on the side face 124 on the other side of the measuring unit 113 along the X-axis direction of the measuring unit 113. The first sub-passage groove 151 forms, in conjunction with the cover, a first sub-passage 134A that takes in the measured gas 2 flowing in the main passage 22 through the sub-passage inlet 131 and returns the taken measured gas 2 to the main passage 22 through the first outlet 132. The first sub-passage 134A has a flow path extending from the sub-passage inlet 131 along the flow direction of the measured gas 2 in the main passage 22 and leading to the first outlet 132.

The second sub-passage groove 152 branches in a middle position of the first sub-passage groove 151 and is bent toward the base end portion side (flange side) of the measuring unit 113, so as to extend along the Z-axis direction of the measuring unit 113; is then folded, in the base end portion of the measuring unit 113, toward the other side (side face 124 side) in the X-axis direction of the measuring unit 113 to make a U-turn toward the leading end portion of the measuring unit 113, so as to extend again along the Z-axis direction of the measuring unit 113; and is then bent, right before the first outlet 132, toward the other side (side face 124 side) in the X-axis direction of the measuring unit 113 so as to be provided continuously with the second outlet 133 that opens on the side face 124 of the measuring unit 113. The second outlet 133 is disposed facing toward the downstream side in the flow direction of the measured gas 2 in the main passage 22. The second outlet 133 has an opening area slightly larger than that of the first outlet 132 and is formed in a position adjacent to the base end portion side relative to the first outlet 132 in the long-side direction of the measuring unit 113.

The second sub-passage groove 152 forms, in conjunction with a cover 200, a second sub-passage 134B that allows the measured gas 2 branched and flown from the first sub-passage 134A to pass therethrough and to return to the main passage 22 through the second outlet 133. The second sub-passage 134B has a flow path that reciprocates along the Z-axis direction of the measuring unit 113. That is, the second sub-passage 134B includes a forward passage portion 134B1 that branches in a middle of the first sub-passage 134A and extends toward the base end portion side (direction of leaving away from the first sub-passage 134A) of the measuring unit 113, and a return passage portion 134B2 that is folded back on the base end portion side (end of the forward passage portion 134B1) of the measuring unit 113 to make a U-turn, and extends toward the leading end portion side (direction of approaching the first sub-passage 134A) of the measuring unit 113. The return passage portion 134B2 has a flow path leading to the second outlet 133 that opens toward the downstream side in the flow direction of the measured gas 2 and in a position on the downstream side in the flow direction of the measured gas 2 in the main passage 22 relative to the sub-passage inlet 131.

In the second sub-passage 134B, the flow rate sensor 311 is disposed in a middle position of the forward passage portion 134B1. In the second sub-passage 134B, since the passage is formed so as to extend and reciprocate along the long-side direction of the measuring unit 113, a longer passage can be secured, and when pulsation is generated in the main passage, the effect on the flow rate sensor 311 can be reduced. The flow rate sensor 311 is provided in a chip package 310, and the chip package 310 is mounted on the circuit board 300.

Figure 3:
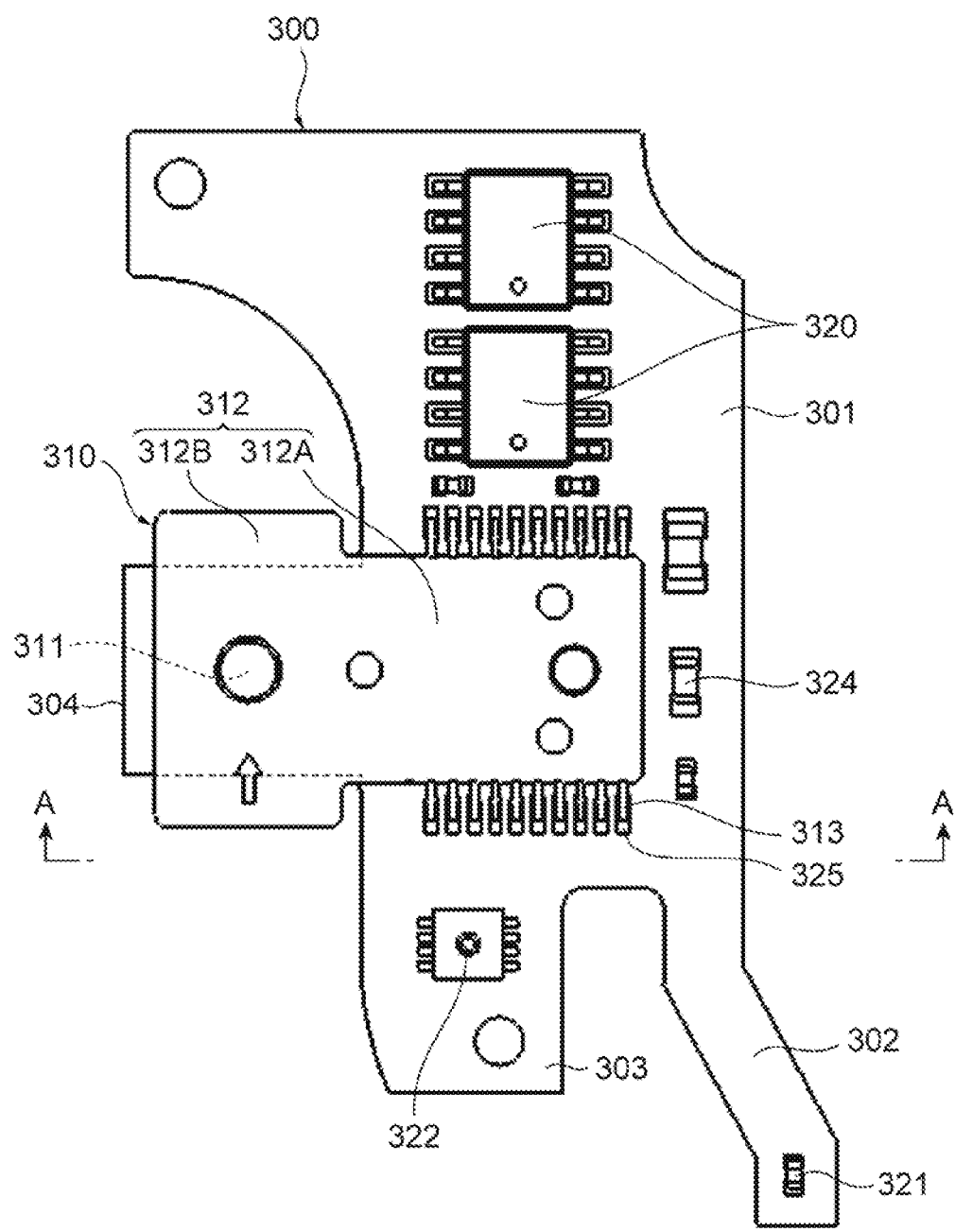
FIG. 3 is a front view of a circuit board on which a chip package is mounted in the first embodiment.
Figure 4:
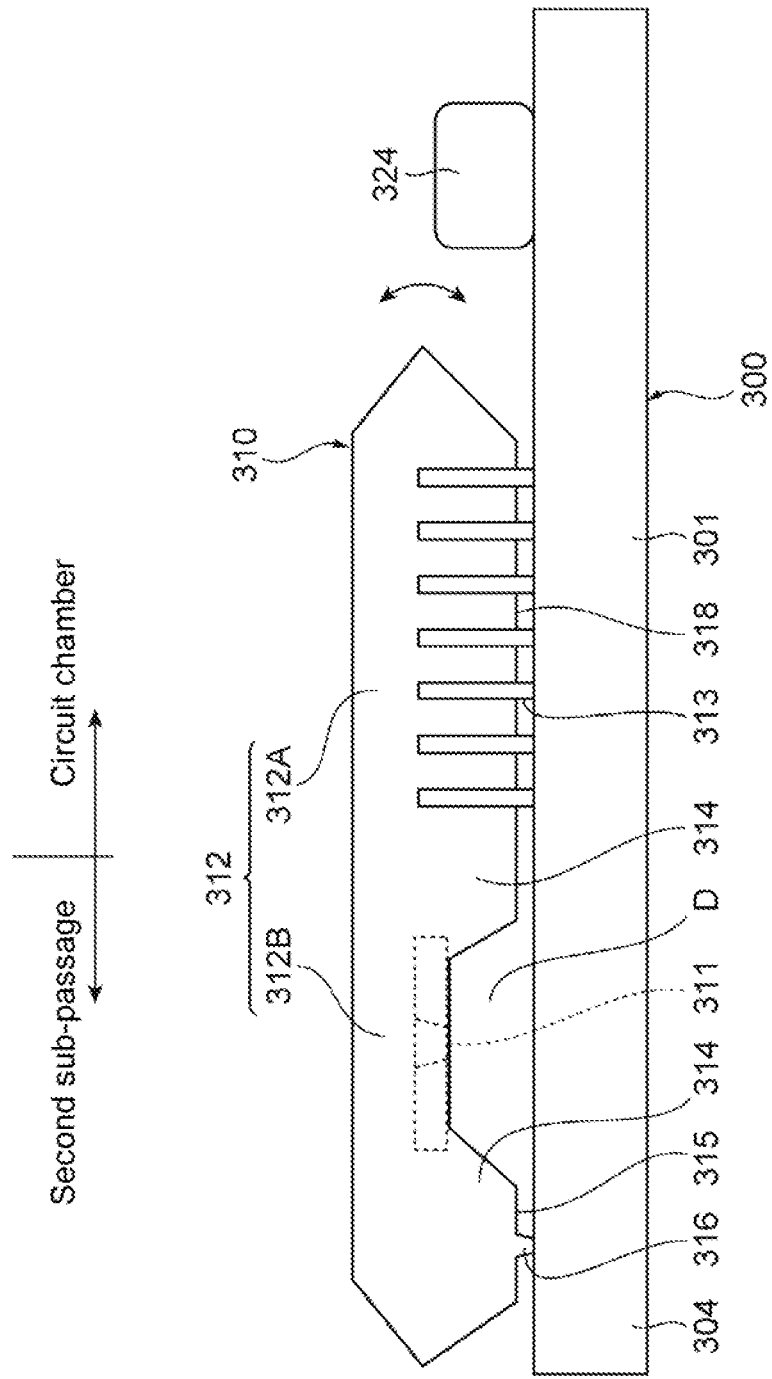
FIG. 4 is a schematic sectional view taken along arrow A-A of FIG. 3.
Figure 8:
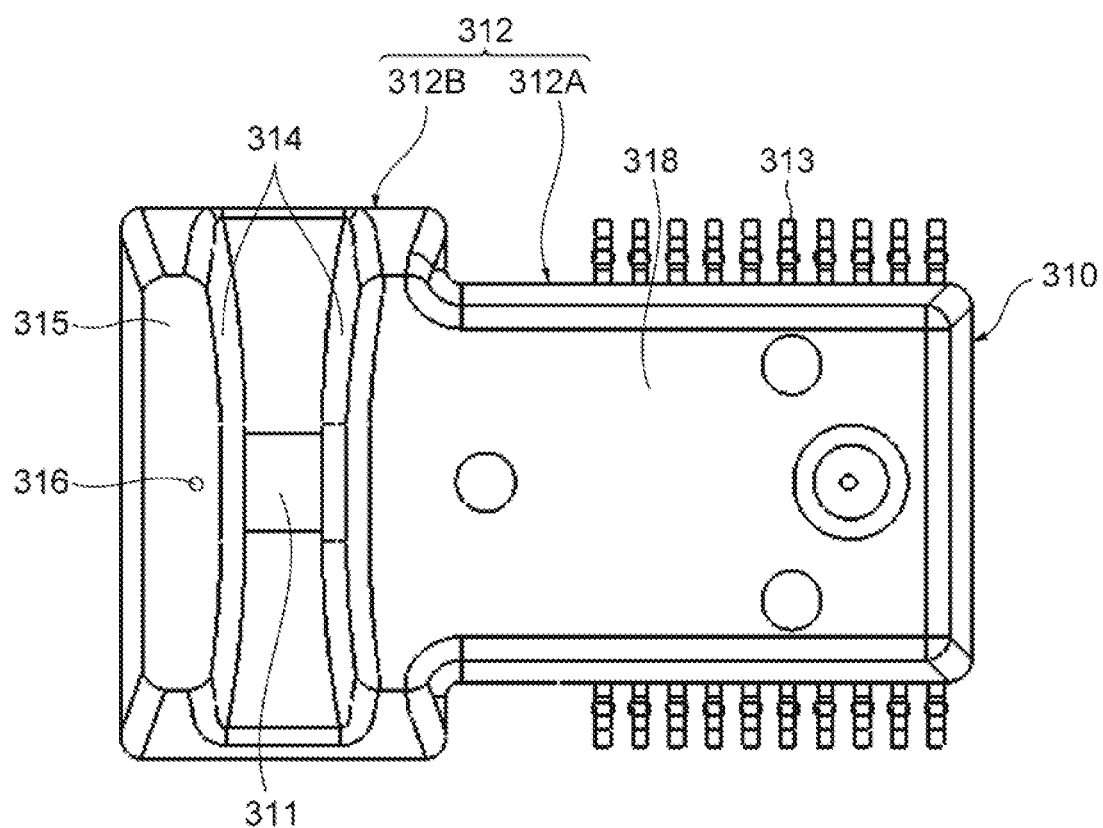
FIG. 8 is a rear view of the chip package in the first embodiment.

FIG. 3 is a front view of a circuit board on which a chip package is mounted in the first embodiment, FIG. 4 is a schematic sectional view taken along arrow A-A of FIG. 3, and FIG. 8 is a rear view of the chip package in the first embodiment.

In the circuit board 300, circuit components, such as the chip package 310, a pressure sensor 320, the intake air temperature sensor 321, and the humidity sensor 322, are mounted on a mounting surface. The circuit board 300 has a substantially rectangular shape in planar view and, as illustrated in FIG. 2, is disposed inside the measuring unit 113, with the longer side of the circuit board 300 extending from the base end portion toward the leading end portion of the measuring unit 113 and with the shorter side of the circuit board 300 extending from the side face 123 toward the side face 124 of the measuring unit 113.

The circuit board 300 includes a main body portion 301 disposed inside the circuit chamber 135, and is provided with a first projecting portion 302 disposed in the temperature detection passage 136, a second projecting portion 303 disposed in the humidity measuring chamber 137, and a third projecting portion 304 disposed in the forward passage portion 134B1 of the second sub-passage 134B, each of which extends from the main body portion 301 so as to be flush with each other. The intake air temperature sensor 321 is mounted on the leading end portion of the first projecting portion 302 and the humidity sensor 322 is mounted on the second projecting portion 303. The third projecting portion 304 is disposed facing the chip package 310 in the forward passage portion 134B1 of the second sub-passage 134B.

The chip package 310 has a resin package structure in which the flow rate sensor 311, the LSI, and the lead frame are molded with resin. The flow rate sensor 311 and the LSI are mounted on the lead frame. The chip package 310 is formed by sealing the flow rate sensor 311 with resin such that the diaphragm of the flow rate sensor 311 is exposed. The chip package 310 includes a flat plate-shaped package main body 312 having a predetermined plate thickness that is formed of a molded resin. The chip package 310 is disposed with a base end portion 312A of the package main body 312 disposed inside the circuit chamber 135 and with a leading end portion 312B of the package main body 312 projecting in the second sub-passage groove 152. The chip package 310 is electrically connected and mechanically fixed to the circuit board 300 by means of a fixing portion.

The base end portion 312A of the package main body 312 is provided with a plurality of connection terminals 313. The plurality of connection terminals 313 is provided so as to project from the opposite end portions in the width direction of the base end portion 312A of the package main body 312 toward a direction of moving away from each other along the width direction of the package main body 312, and the tip ends of the connection terminals 313 are bent in the thickness direction of the base end portion 312A and disposed in positions further projected relative to a back face 318 of the base end portion 312A.

The leading end portion 312B of the package main body 312 is disposed in the forward passage portion 134B1 of the second sub-passage 134B so as to face the third projecting portion 304 of the circuit board 300. A recessed groove is formed between a pair of passage walls 314 in the leading end portion 312B of the package main body 312. The pair of passage walls 314 are formed so as to extend in the width direction of the package main body 312 on a back face 315 of the leading end portion 312B of the package main body 312 and the flow rate sensor 311 is disposed so as to be exposed in a middle position in the extending direction and on the bottom surface of the recessed groove.

The chip package 310 is disposed relative to the housing 100 such that the pair of passage walls 314 extend along the forward passage portion 134B1 of the second sub-passage 134B. The chip package 310 is disposed such that the flow rate sensor 311 faces the third projecting portion 304 that is a portion of the circuit board 300. Thus, a passage D is formed between the recessed groove of the package main body 312 and the third projecting portion 304 of the circuit board 300. The measured gas 2 flowing through the second sub-passage 134B passes through the passage D and the flow rate of the measured gas 2 is detected by the flow rate sensor 311.

The chip package 310 is fixed to the circuit board 300 by soldering the connection terminals 313 to the circuit board 300. That is, the soldered portion constitutes the fixing portion that electrically connects and mechanically fixes the chip package 310 to the circuit board 300. However, the fixing method for fixing the chip package 310 to the circuit board 300 is not limited to soldering. For example, press-fitting by forming the plurality of connection terminals as press-fit terminals and inserting those press-fit terminals into through-holes drilled on the circuit board 300 for connection or a fixing method of adhering the plurality of connection terminals 313 to a connection pad of the circuit board 300 with application of a conductive adhesive, such as a silver paste, may be adopted.

The chip package 310 is disposed with the ends of the connection terminals 313 projecting further in the thickness direction relative to the back face 318 of the base end portion 312A of the package main body 312, and is thus fixed to the circuit board 300 in a state in which a predetermined gap is formed between the back face 318 of the base end portion 312A of the package main body 312 and the mounting surface of the main body portion 301 of the circuit board 300, by soldering the connection terminals 313 to the circuit board 300.

The chip package 310 of the present embodiment is configured such that the surfaces on the opposite sides of the passage wall 314, that is, the back face 318 of the base end portion 312A of the package main body 312 and the back face 315 of the leading end portion 312B of the package main body 312 are flush with each other, as illustrated in FIG. 4, and the back face 315 of the leading end portion 312B of the package main body 312 is provided with a protrusion 316 projecting from the back face 315. The protrusion 316 is formed of the molded resin that forms the package main body 312 and is formed by projecting a portion of the passage wall 314 that is the resin portion.

The protrusion 316 has a shape that supports the leading end portion 312B of the chip package 310 by contacting the third projecting portion 304 of the circuit board 300, with the base end portion 312A of the chip package 310 disposed in the main body portion 301 of the circuit board 300. The portion where the protrusion 316 contacts the circuit board 300 is positioned on the flow rate sensor 311 side relative to the fixing portion where the chip package 310 is fixed to the circuit board 300. In particular, in the embodiment illustrated in FIG. 4, the protrusion 316 is provided so as to project on a surface on the leading end side of the package main body 312 relative to the recessed groove on the back face 315 of the leading end portion 312B of the package main body 312. The flow rate sensor 311 is positioned between the fixing portion that fixes the chip package 310 to the circuit board 300 and the protrusion 316 contacting the circuit board 300.

Therefore, in fixing the chip package 310 by soldering to the circuit board 300, the base end portion 312A of the package main body 312 is supported by the connection terminals 313 and the leading end portion 312B of the package main body 312 is supported by the protrusion 316 so as to support the package main body 312 at its both ends on the circuit board 300, so that the posture of the package main body 312 relative to the circuit board 300 can be stabilized. Accordingly, the chip package 310 can be prevented from being fixed by soldering with a posture further inclined relative to the circuit board 300 as compared to a reference due to the movement of the leading end portion 312B side of the package main body 312 in a direction in which it approaches or leaves the circuit board 300.

It should be noted that the protrusion 316 is not limited to a molded resin, and only needs to be capable of supporting the leading end portion 312B of the package main body 312 by contacting the third projecting portion 304 of the circuit board 300, and may be configured such that a portion of the lead frame projects from the package main body 312, for example.

Figure 13:
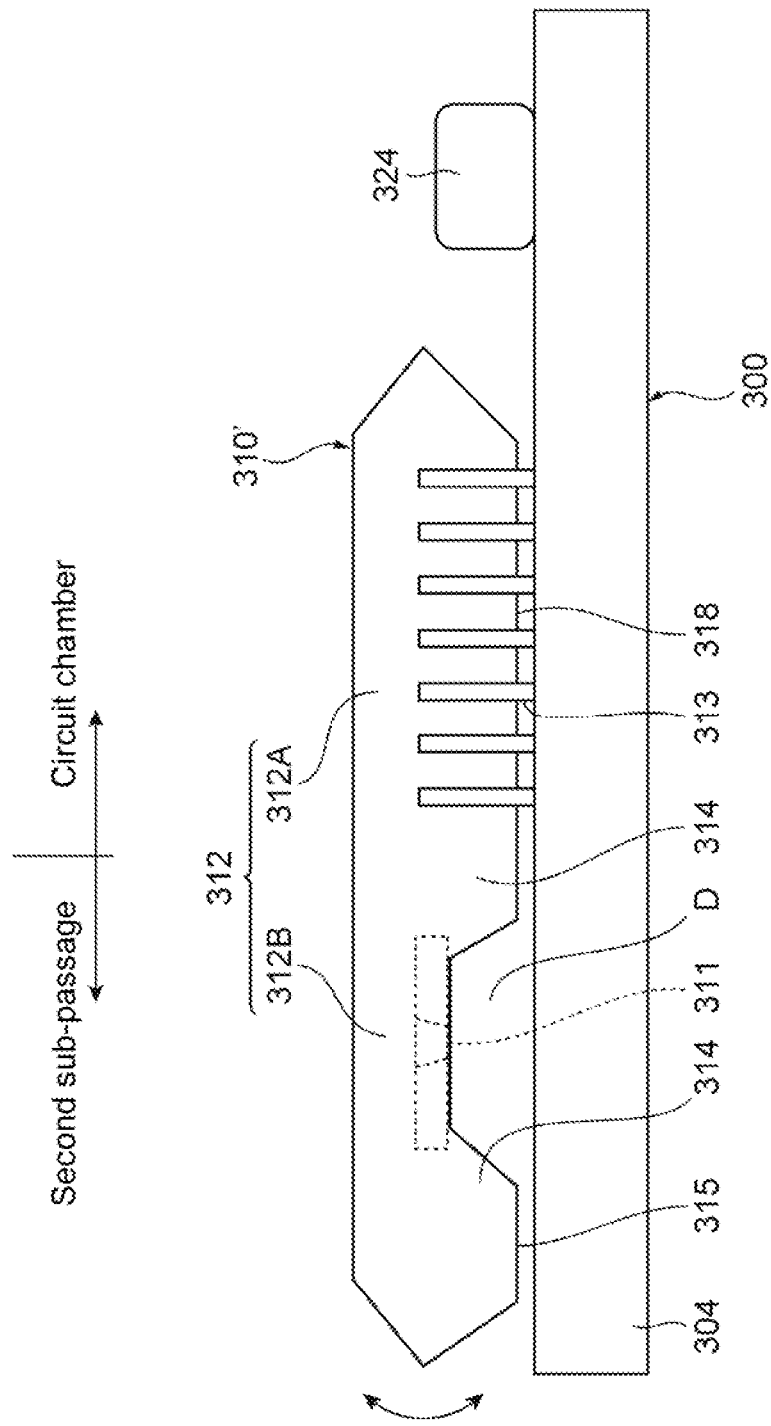
FIG. 13 is a view explaining a comparative example.

FIG. 13 is a view explaining a comparative example, the view corresponding to FIG. 4.

In the case of the comparative example illustrated in FIG. 13, as compared to the configuration illustrated in FIG. 4, the back face 315 of the leading end portion 312B of the package main body 312 is not provided with the protrusion 316, and the leading end portion 312B of the package main body 312 is in a state of being lifted from the circuit board 300. That is, a chip package 310' of the comparative example is in a cantilever state with the base end portion 312A of the package main body 312 supported on the circuit board 300.

Therefore, in fixing the chip package 310' by soldering to the circuit board 300, the posture of the package main body 312 is unstable, and as shown by the arrow in FIG. 13, there is a possibility that the leading end portion 312B side of the package main body 312 moves in a direction in which it approaches or leaves the circuit board 300. Further, when the chip package 310' is fixed to the circuit board 300 with a posture further inclined as compared to the reference, the size of the passage D changes, which could cause variations in the flow rate detection accuracy of each object.

On the other hand, in the present embodiment, as illustrated in FIG. 4, since the protrusion 316 is provided in the leading end portion 312B of the package main body 312 and the protrusion 316 is contacted to the circuit board 300 so as to support the leading end portion 312B, the base end portion 312A and leading end portion 312B of the package main body 312 both can be supported. Therefore, the posture of the package main body 312 relative to the circuit board 300 can be stabilized and in fixing the chip package 310 by soldering to the circuit board 300, the chip package 310 can be prevented from being fixed by soldering with an inclined posture relative to the circuit board 300. Accordingly, the size of the passage D can be maintained constant, so that generation of variations in the flow rate detection accuracy of each object can be prevented.

Figure 5:
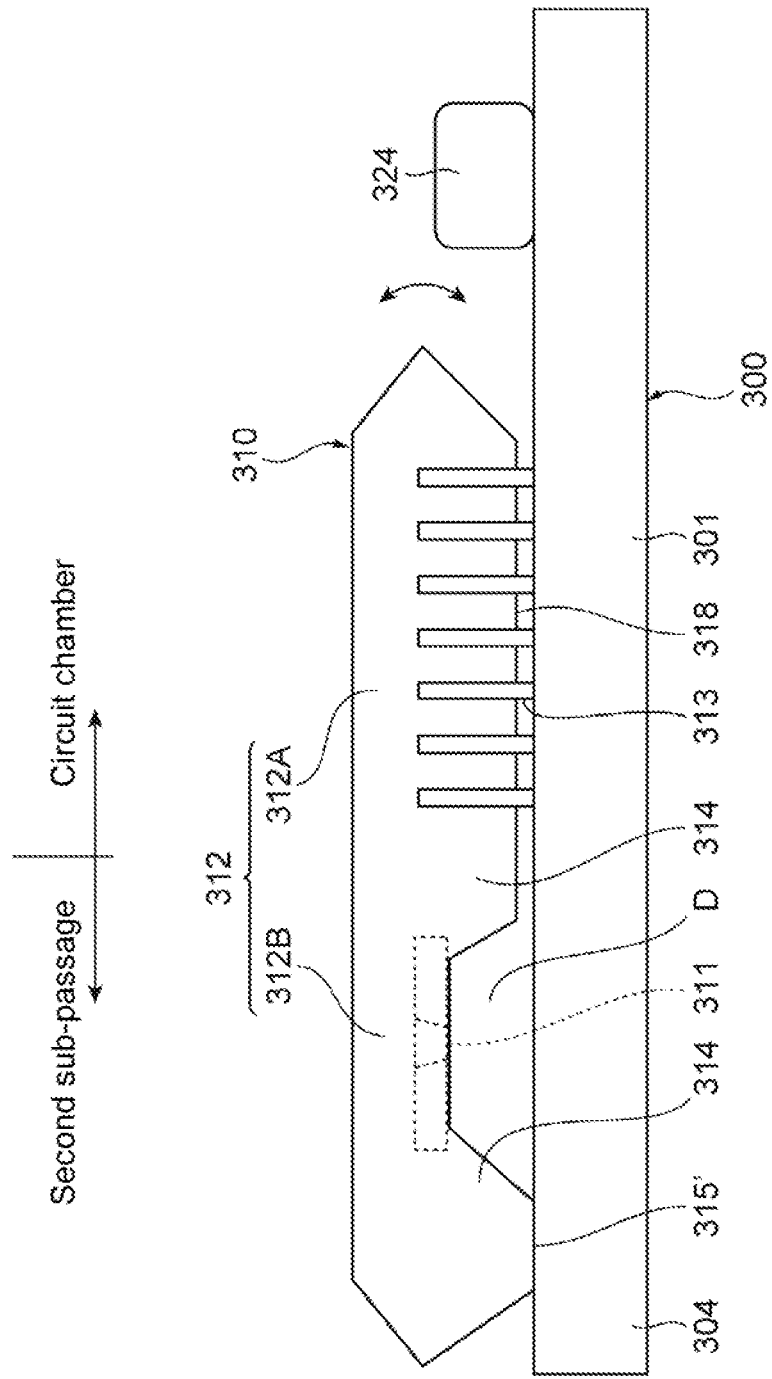
FIG. 5 is a view explaining a modification, the view corresponding to FIG. 4.
Figure 6:
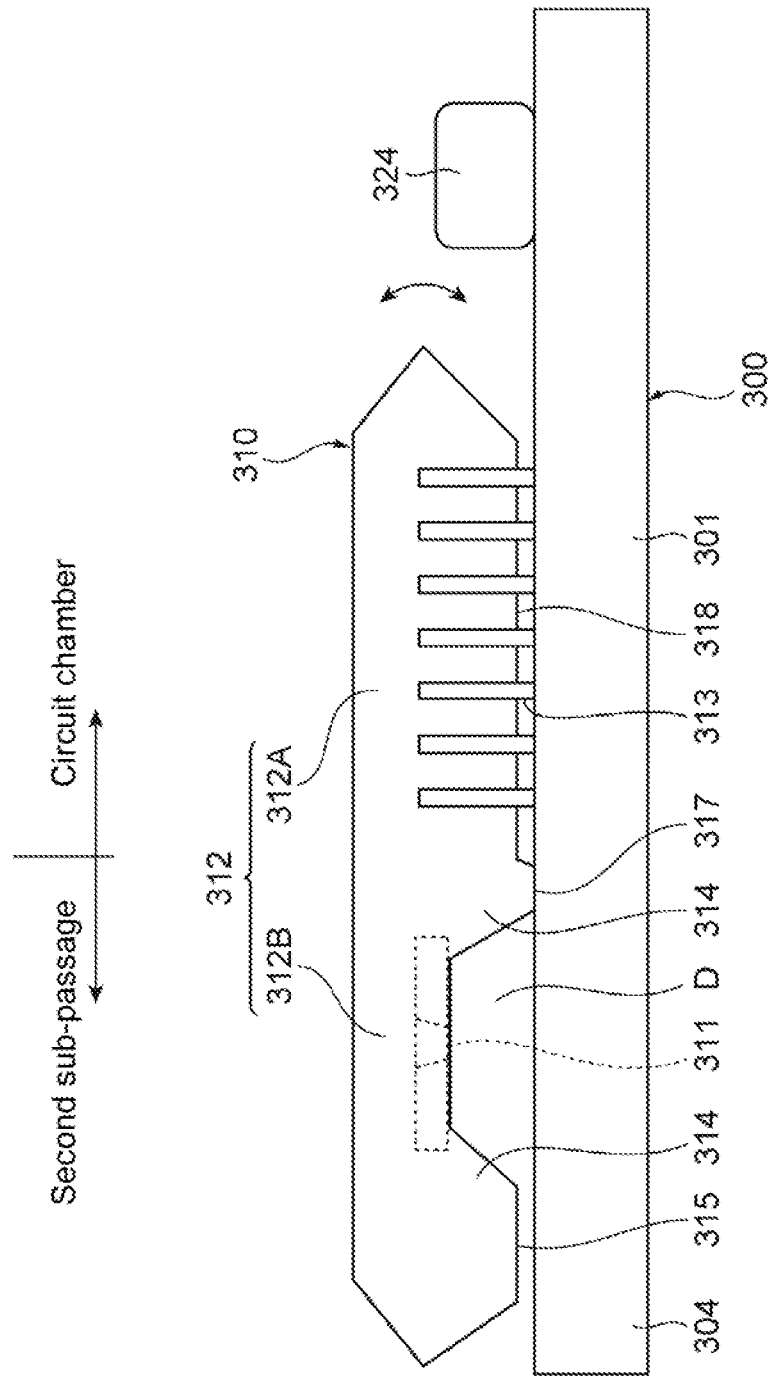
FIG. 6 is a view explaining another modification, the view corresponding to FIG. 4.
Figure 7:
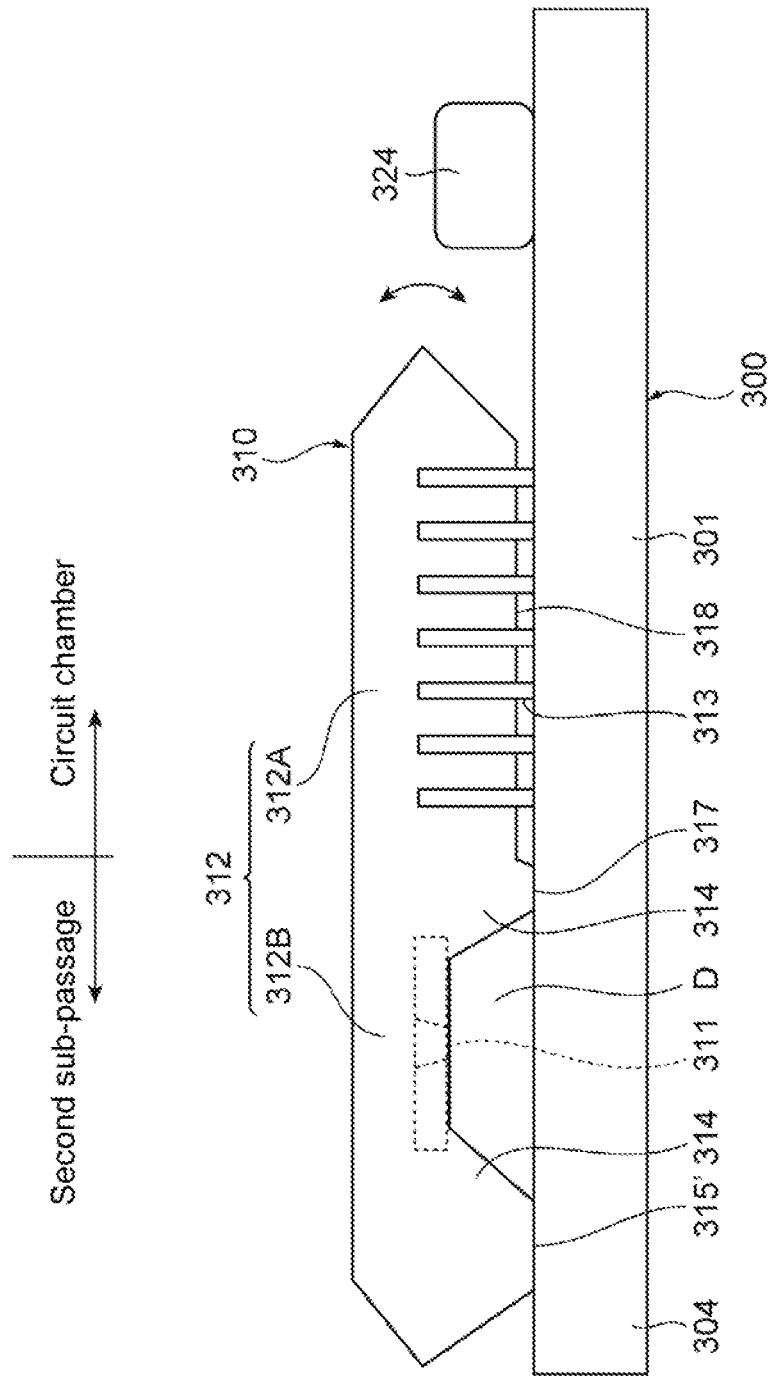
FIG. 7 is a view explaining yet another modification, the view corresponding to FIG. 4.

FIG. 5 to FIG. 7 are views explaining other modifications, the views corresponding to FIG. 4.

The modification illustrated in FIG. 5 has a configuration in which a facing surface 315' on the leading end portion 312B side that is a surface on one side of the passage wall 314 on the back face 315 of the leading end portion 312B of the package main body 312 is formed in a position projecting further relative to the back face 318 of the base end portion 312A to be brought into surface contact with the third projecting portion 304 of the circuit board 300, instead of providing the protrusion 316. According to the present modification, the inclination of the leading end portion 312B side of the package main body 312 in a direction in which it approaches or leaves the circuit board 300 as compared to the base end portion 312A can be suppressed, so that the package main body 312 can be supported on the circuit board 300 with a stable posture.

The modification illustrated in FIG. 6 has a configuration in which a protrusion 317 projecting in a portion on the base end portion 312A side relative to the passage wall 314 on the back face 315 of the leading end portion 312B of the package main body 312 is provided to be brought into contact with the third projecting portion 304 of the circuit board 300, instead of providing the protrusion 316. According to the present modification, as with the modification illustrated in FIG. 5, the inclination of the leading end portion 312B side of the package main body 312 in a direction in which it approaches or leaves the circuit board 300 as compared to the base end portion 312A can be suppressed, so that the package main body 312 can be supported on the circuit board 300 with a stable posture.

The modification illustrated in FIG. 7, which combines the configurations illustrated in FIG. 5 and FIG. 6, brings the aforementioned facing surface 315' and protrusion 317 into contact with the circuit board 300. That is, the modification includes the configuration in which the facing surface 315' on the leading end portion 312B side relative to the passage wall 314 on the back face 315 of the leading end portion 312B of the package main body 312 is formed in a position projecting further relative to the back face 318 of the base end portion 312A to be brought into surface contact with the third projecting portion 304 of the circuit board 300, and the configuration in which the protrusion 317 projecting in a portion on the base end portion 312A side relative to the passage wall 314 on the back face 315 of the leading end portion 312B of the package main body 312 is provided to be brought into contact with the third projecting portion 304 of the circuit board 300.

According to the present modification, since it has the configuration in which both the facing surface 315' and protrusion 317, which are the surfaces on the opposite sides of the passage wall 314, are individually contacted to the circuit board 300, the inclination of the leading end portion 312B side of the package main body 312 in a direction in which it approaches or leaves the circuit board 300 as compared to the base end portion 312A can be more surely suppressed, so that the package main body 312 can be supported on the circuit board 300 with a stable posture.

Figure 9:
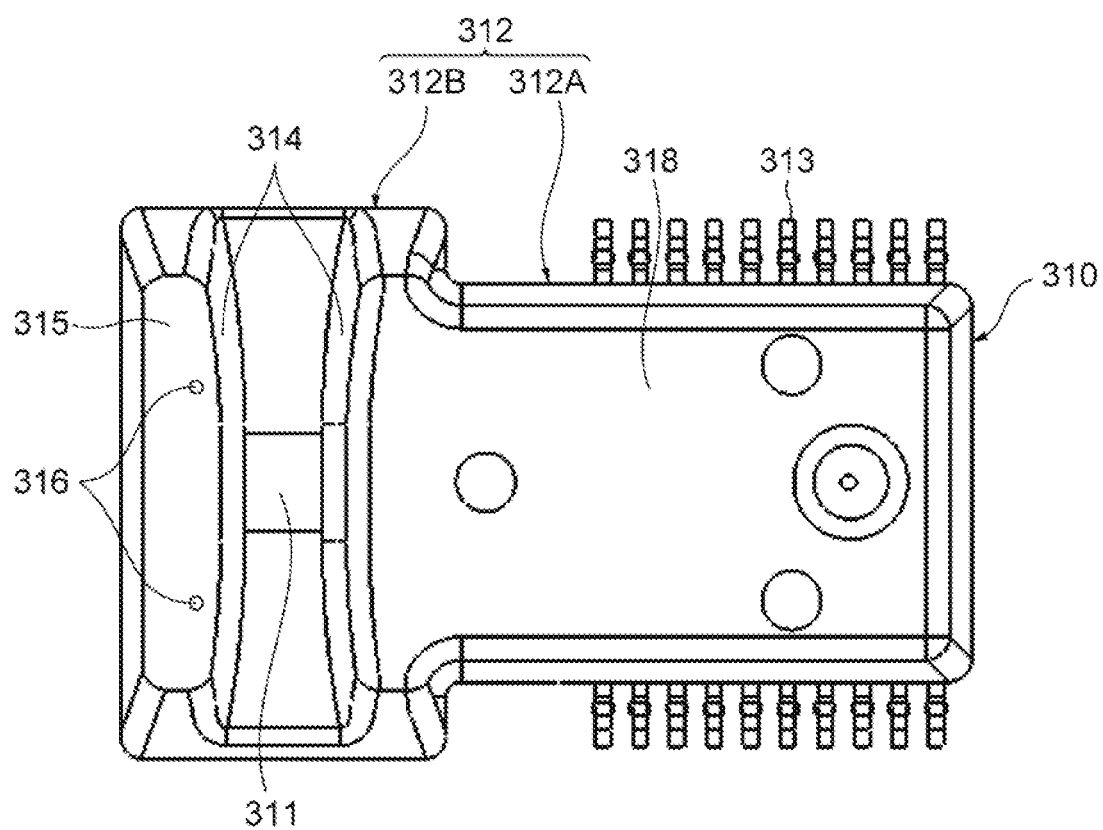
FIG. 9 is a view explaining a modification, the view corresponding to FIG. 8.
Figure 10:
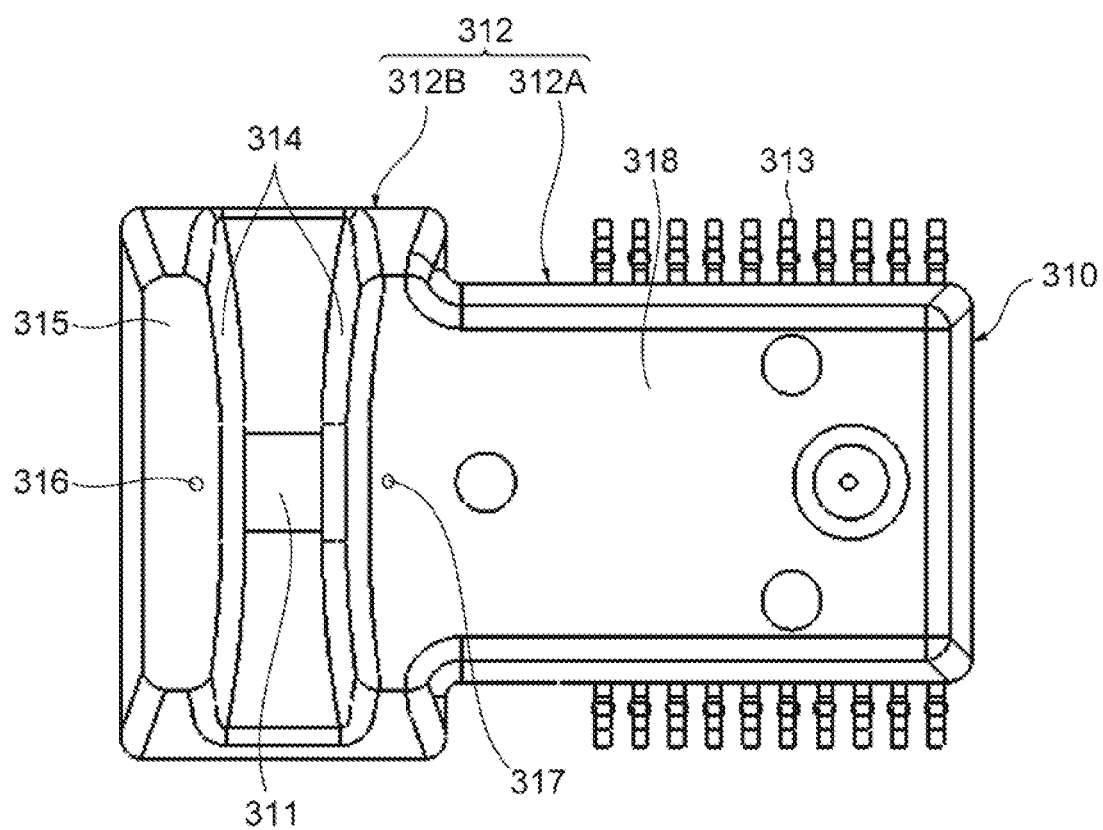
FIG. 10 is a view explaining another modification, the view corresponding to FIG. 8.
Figure 11:
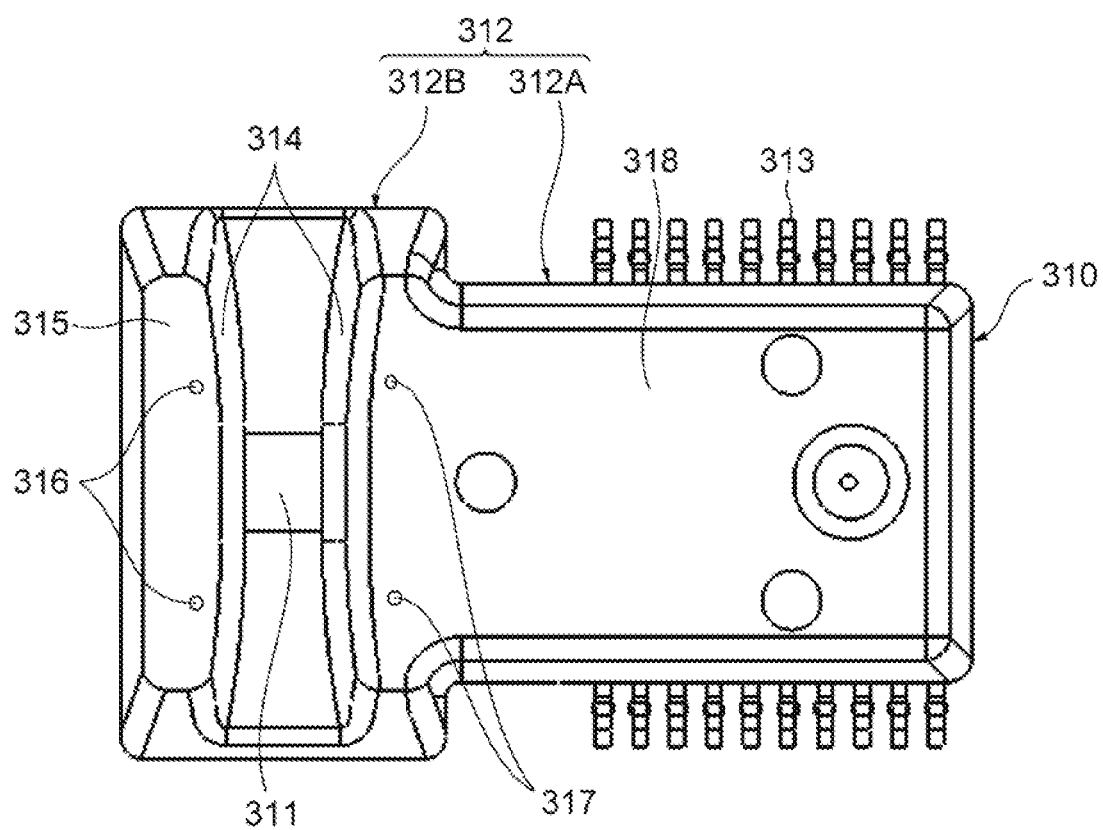
FIG. 11 is a view explaining yet another modification, the view corresponding to FIG. 8.

FIG. 9 to FIG. 11 are views explaining other modifications, the views corresponding to FIG. 8.

The modification illustrated in FIG. 9 is provided with two protrusions 316 on the leading end portion 312B side relative to the passage wall 314 on the back face 315 of the leading end portion 312B of the package main body 312. The two protrusions 316 are separately disposed in the positions distanced in the width direction of the package main body 312, and suppress the inclination in the width direction of the package main body 312, so that the package main body 312 can be supported on the circuit board 300 with a stable posture.

The modification illustrated in FIG. 10 is provided with the protrusion 316 on the leading end portion 312B side relative to the passage wall 314 on the back face 315 of the leading end portion 312B of the package main body 312 and is also provided with the protrusion 317 on the base end portion 312A side relative to the passage wall 314. The protrusions 316, 317 are disposed in the center positions in the width direction of the package main body 312 and suppress the inclination of the leading end portion 312B side of the package main body 312 in a direction in which it approaches or leaves the circuit board 300 as compared to the base end portion 312A, so that the package main body 312 can be supported on the circuit board 300 with a stable posture.

The modification illustrated in FIG. 11 is provided with two of each of the protrusions 316, 317 illustrated in FIG. 10. The two protrusions 316, 317 are separately disposed in the positions distanced in the width direction of the package main body 312, and suppress the inclination in the width direction of the package main body 312 and the inclination of the leading end portion 312B side of the package main body 312 in a direction in which it approaches or leaves the circuit board 300 as compared to the base end portion 312A, so that the package main body 312 can be supported on the circuit board 300 with a stable posture.

According to the flow rate measurement device 20 of the aforementioned present embodiments, the base end portion 312A and leading end portion 312B of the package main body 312 both can be supported on the circuit board 300 so that the posture of the package main body 312 relative to the circuit board 300 can be stabilized. Therefore, in fixing the chip package 310 by soldering to the circuit board 300, the chip package 310 can be prevented from being fixed by soldering with a posture inclined relative to the circuit board 300, so that the size of the passage D can be maintained constant, and generation of variations in the flow rate detection accuracy of each object can be prevented.

Second Embodiment

Figure 12:
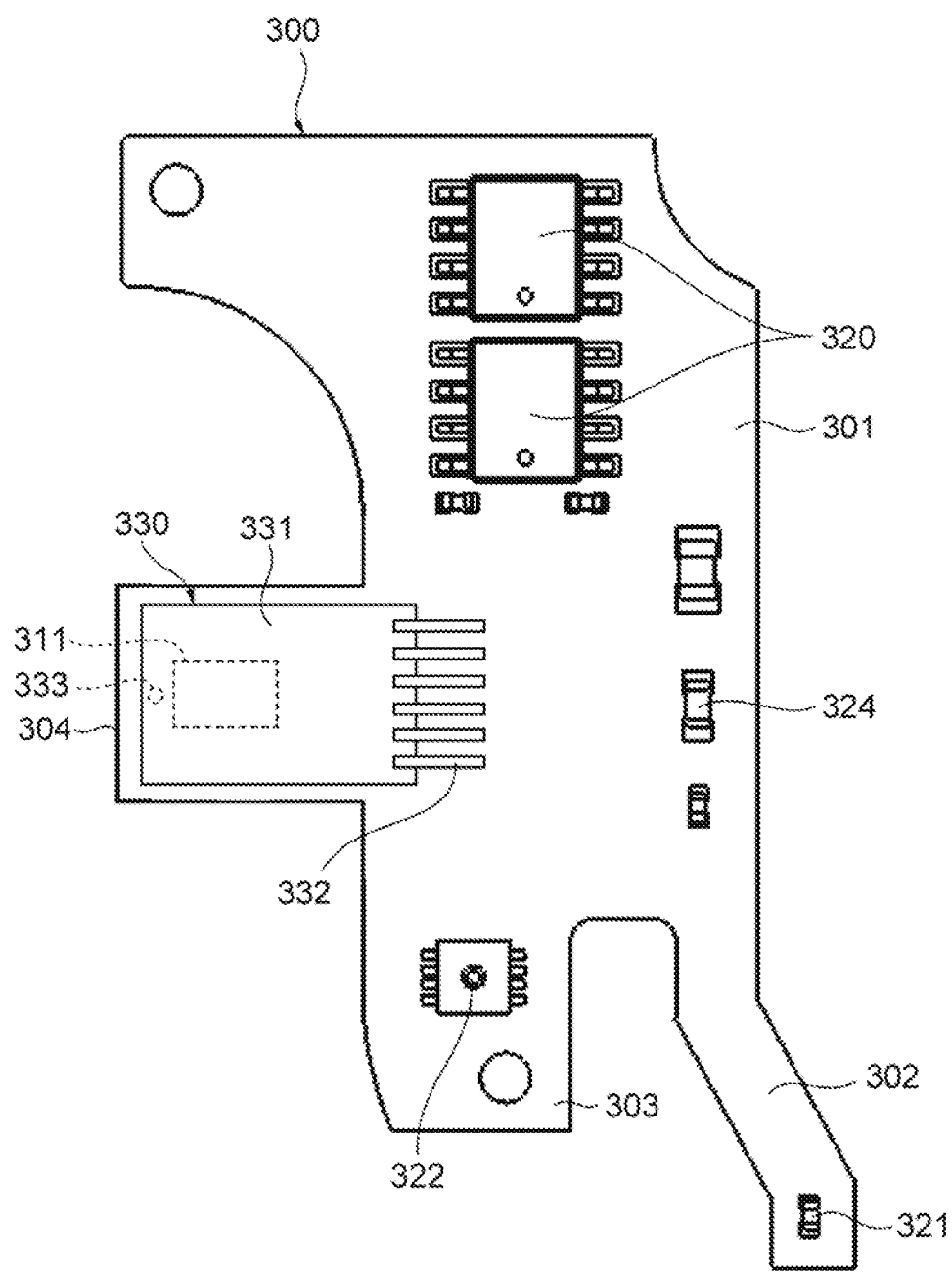
FIG. 12 is a front view of the circuit board on which the chip package is mounted in a second embodiment.

FIG. 12 is a front view of the circuit board on which the chip package is mounted in a second embodiment, the view corresponding to FIG. 3.

The characteristic of the present embodiment is that a mounting board 330 on which the flow rate sensor 311 is mounted is used instead of the chip package 310. In each of the aforementioned embodiments, the example of the case in which the chip package 310 including the flow rate sensor 311 is mounted on the circuit board 300 has been described, but the flow rate sensor 311 only needs to be fixed to the circuit board 300 so as to face the third projecting portion 304 of the circuit board 300, and the chip package 310 is not an essential element.

The mounting board 330 is disposed with the base end portion of a board main body 331 fixed to the main body portion 301 of the circuit board 300 and with the leading end portion projecting in the second sub-passage 134B. The flow rate sensor 311 is provided on the back face of the mounting board 330 and is disposed facing the third projecting portion 304 of the circuit board 300 with a predetermined gap therebetween so as to allow the measured gas 2 flown into the second sub-passage 134B to pass therethrough. Further, the leading end portion of the board main body 331 is provided with a protrusion 333 projecting from the back face of the board main body 331 toward the circuit board 300. The protrusion 333 is configured to contact the third projecting portion 304 of the circuit board 300 so as to support the leading end portion of the board main body 331.

It should be noted that in the present embodiment, the example of the case in which the protrusion 333 is provided on the board main body 331 of the mounting board 330 has been described, but it is only necessary to enable the inclination of the board main body 331 relative to the third projecting portion 304 of the circuit board 300 to be suppressed by supporting the leading end portion of the mounting board 330. For example, the configuration may be made such that the protrusion projects from the third projecting portion 304 of the circuit board 300 toward the mounting board 330 to be brought into contact with the back face of the board main body 331 of the mounting board 330, so that the leading end portion of the mounting board 330 is supported.

The mounting board 330 includes the board main body 331 and a plurality of connection terminals 332 projecting from the board main body 331. The mounting board 330 is fixed by connecting the plurality of connection terminals 332 to the circuit board 300. The fixing method for fixing the plurality of connection terminals 332 to the circuit board 300 may include, for example, use of soldering. However, the fixing method is not limited to soldering, but press-fitting by forming the plurality of connection terminals as press-fit terminals and inserting those press-fit terminals into through-holes drilled on the circuit board 300 for connection or a fixing method of adhering the plurality of connection terminals 332 to a connection pad of the circuit board 300 with application of a conductive adhesive, such as a silver paste, may be adopted.

Although the embodiments of the present invention have been described in detail, the present invention is not limited to the aforementioned embodiments, and various design changes can be made in the scope without departing from the spirit of the present invention described in the claims. For example, the aforementioned embodiments have been described in detail for easy understanding of the present invention, but are not necessarily limited to those including all the described features. Further, replacing a portion of the configuration of one embodiment with those of another embodiment is available, and addition of the configuration of one embodiment to the configuration of another embodiment is also available. Furthermore, for a portion of the configuration of each embodiment, addition and deletion of and replacement with another configuration are available.

REFERENCE SIGNS LIST

300 Circuit board (board)
304 Third projecting portion (portion of board)
310 Chip package (resin package)
311 Flow rate sensor (flow rate detection element)
312 Package main body
312A Base end portion
312B Leading end portion
313 Connection terminal
314 Passage wall
315 Back face
316 Protrusion

The invention claimed is:

1. A flow rate measurement device comprising:
   a resin package including a flow rate detection element and a passage wall formed therein;
   a circuit board on which the resin package is mounted, wherein
      the resin package is mounted such that the flow rate detection element is disposed facing a portion of the circuit board and a portion of a resin portion of the resin package contacts the circuit board; and
   a fixing portion that electrically connects and mechanically fixes the resin package to the circuit board, wherein
      a contacting portion of the resin package with the circuit board is positioned on a side of the flow rate detection element relative to the fixing portion.

2. The flow rate measurement device according to claim 1, comprising a fixing portion that electrically connects and mechanically fixes the resin package to the circuit board,
   wherein the flow rate detection element is positioned between the fixing portion and the contacting portion.

3. The flow rate measurement device according to claim 1,
   wherein:
      the flow rate detection element includes a diaphragm,
      the resin package includes a lead frame on which the flow rate detection element is mounted,
      the flow rate detection element is sealed with resin such that the diaphragm is exposed, and
      a portion of the passage wall contacts the circuit board.

4. The flow rate measurement device according to claim 1, wherein the fixing portion adopts any one of soldering, press-fitting, and a conductive adhesive.

5. The flow rate measurement device according to claim 3, wherein a surface on one side of the passage wall of the resin package contacts the circuit board.

6. The flow rate measurement device according to claim 3, wherein surfaces on opposite sides of the passage wall of the resin package contact the circuit board.

7. The flow rate measurement device according to claim 3, comprising:
   a sub-passage adapted to take in a portion of a measured gas flowing through a main passage; and
   a circuit chamber adjacent to the sub-passage and housing the circuit board,
   wherein:
      the circuit board includes the projecting portion that projects from the circuit chamber to the sub-passage, and
      the resin package is mounted on the circuit board such that the flow rate detection element is disposed facing a projecting portion of the circuit board.

8. The flow rate measurement device according to claim 7,
   wherein:
      the resin package includes a base end portion disposed in the circuit chamber and a leading end portion disposed in the sub-passage, and
      the base end portion is provided with a connection terminal connected to the circuit board, and the leading end portion is provided with the flow rate detection element.

9. The flow rate measurement device according to claim 8,
   wherein:
      the resin package includes a recessed groove on a surface of the leading end portion that faces the circuit board, the recessed groove extending along the sub-passage, and
      the flow rate detection element is provided so as to be exposed in the recessed groove.

* * * * *